Jan. 10, 1939.　　　C. A. SNYDER　　　2,143,664
DUST COLLECTING APPARATUS
Filed March 15, 1937　　　3 Sheets-Sheet 2
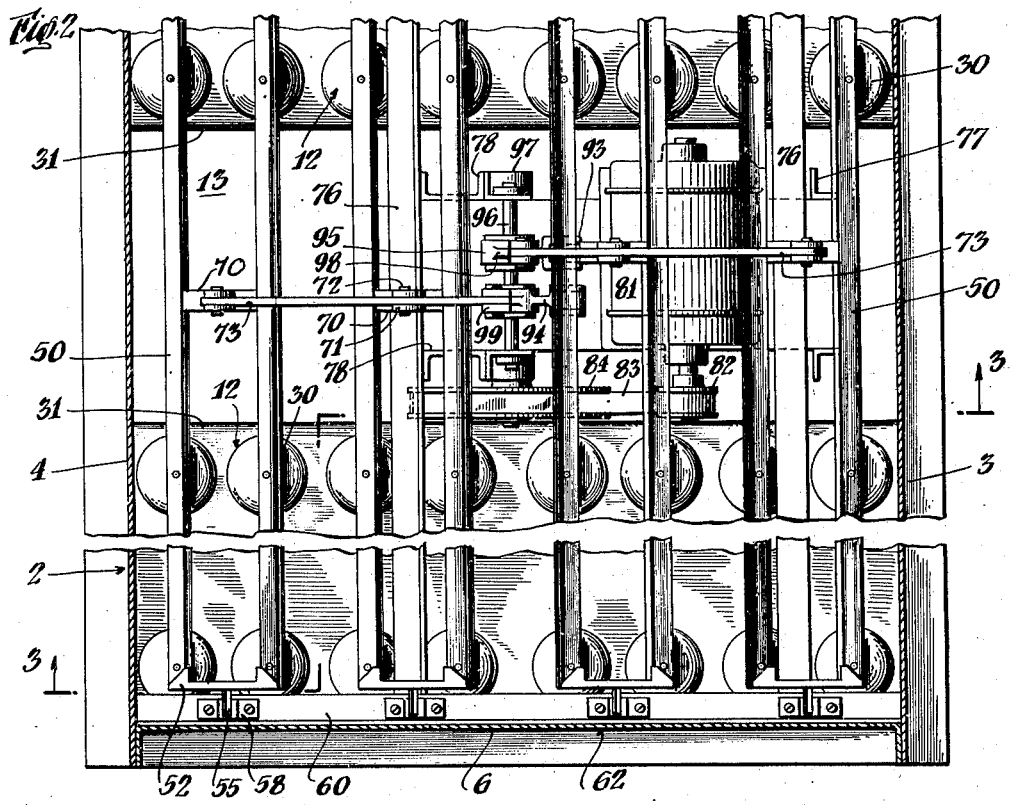
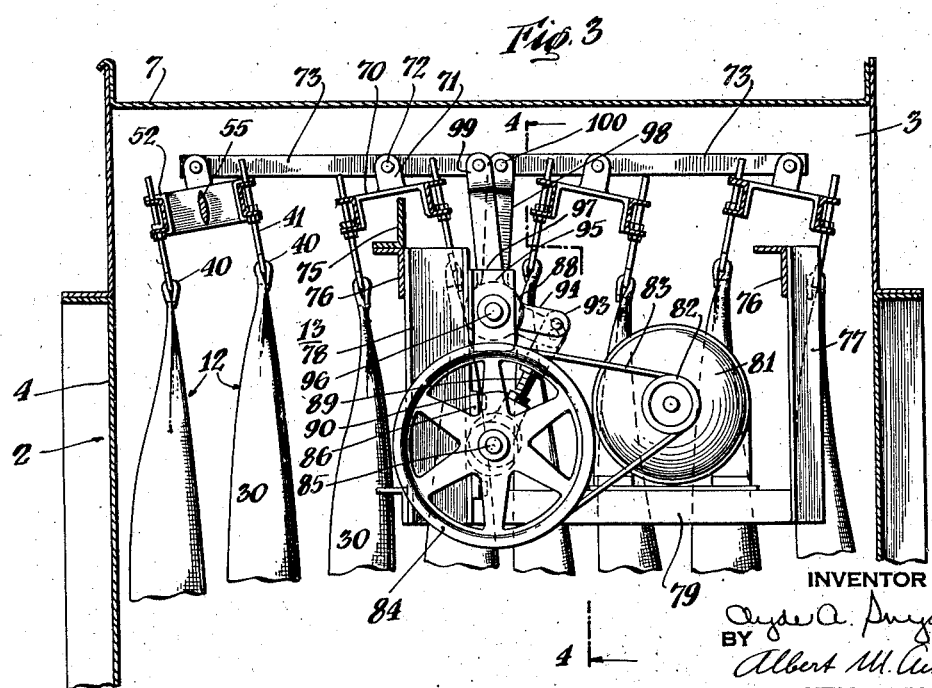
INVENTOR
Clyde A. Snyder
BY Albert M. Austin
ATTORNEY Jan. 10, 1939. C. A. SNYDER 2,143,664
DUST COLLECTING APPARATUS
Filed March 15, 1937 3 Sheets-Sheet 3
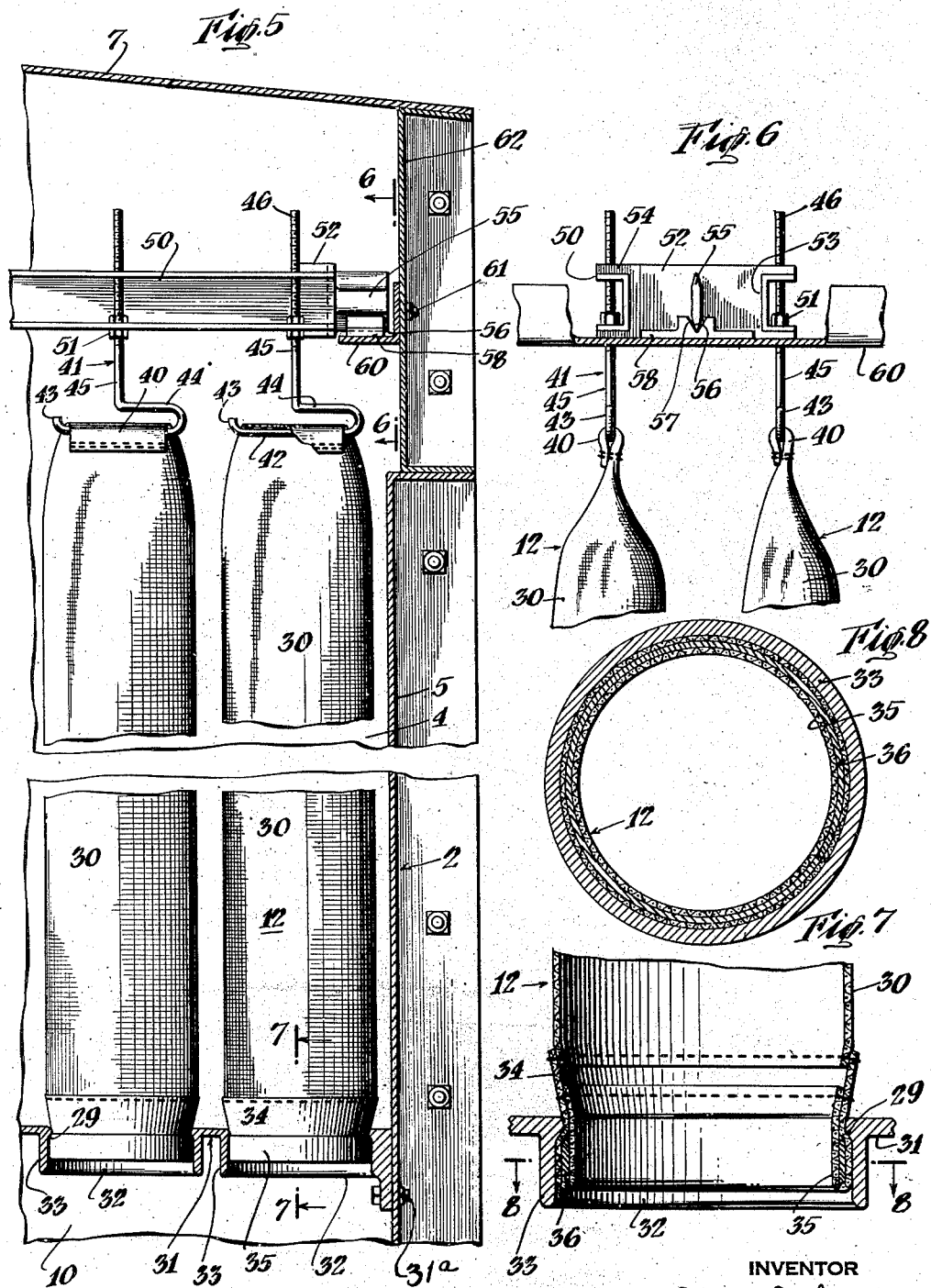

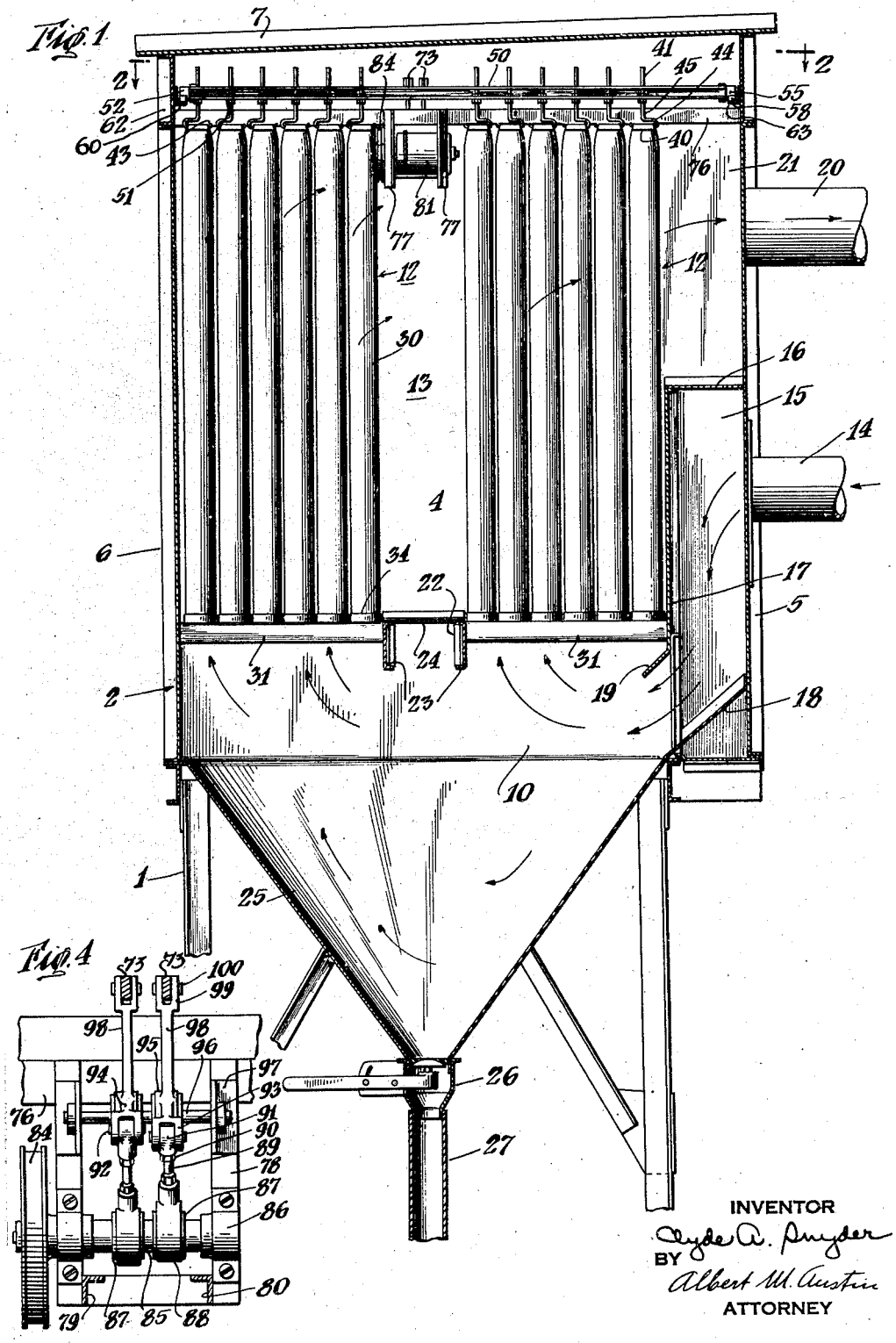

Patented Jan. 10, 1939

2,143,664

UNITED STATES PATENT OFFICE 2,143,664

DUST COLLECTING APPARATUS

Clyde A. Snyder, Mishawaka, Ind., assignor to The American Foundry Equipment Company, Mishawaka, Ind., a corporation of Delaware Application March 15, 1937, Serial No. 130,856

7 Claims. (Cl. 183—58)

This invention relates generally to dust collecting apparatus and more particularly to new and improved apparatus of the type employing one or more flexible filter elements through which air or other gaseous material is passed to remove suspended solid material, such as dust or the like.

In certain commercial operations and processes, such as sand blasting, abrasive cleaning, grinding and others, dust and other solid particles are produced which must be removed from the atmosphere in order to protect the workmen and equipment. Also, in certain other operations, such as smelting, chemical processes and others, it is desirable to remove valuable suspended solids from gases for the purpose of recovering these solids. For this purpose there is often used dust collecting apparatus which includes a chamber having therein a series of tubular filter elements or "bags" and the gas or air to be cleaned is passed through the walls of the bags, the solid particles being deposited on the walls of the bags. In order to maintain the bags sufficiently clean to realize a desirable efficiency, the bags are usually shaken or agitated at proper intervals to remove the deposited solids, which solids are collected and removed from the housing.

In apparatus of this general type it is desirable that the gas or air be passed through the chamber and filter bags in a slow, smooth and evenly distributed current with the minimum of friction loss and in such a way that the larger and heavier particles are thrown out of the current prior to its passage through the bags. The bags should be supported in such a way that there is no leakage but all of the gas passes through the walls of the bags. Also, the bags should be supported in such a way that they can conveniently be installed and removed. It is desirable that the bags be so mounted that they may be shaken or agitated to remove the deposited solids and suitable agitating mechanism should be provided which imparts to the bags an effective shaking movement which does not damage or unduly wear the bags.

According to the present invention, there is provided a housing for a series of filter bags, which housing is formed with an inlet passage and expansion chamber so formed and dimensioned as to produce change of direction and expansion of the current of gas and air before the latter passes into the filter bags, thereby causing the heavier particles to be thrown out of the current. The filter bags register at one end with openings in a cell plate and are provided with resilient rings which effectively seal the bags in the plate but permit the bags to be quickly and easily installed or removed. The bags are suspended from one or more rockable members or shaker bars associated with a mechanism for rocking these members to impart a combined vertical and horizontal agitating movement thereto. This movement of the shaker bars shakes the bags with a snapping or whipping action to remove the deposited solids, which drop into a collecting hopper.

An object of the present invention is the provision of dust collecting apparatus which is simple and economical in construction and operation, and which is certain and effective in operation.

Another object of the invention is the provision of apparatus of the class described which is designed to conduct a current of gas or air through suitable filter bags in such a way to effectively remove the suspended solids with a minimum of pressure loss and a minimum of wear and without or clogging of the apparatus.

Another object of the invention is the provision of apparatus of the class described having a novel mounting and sealing arrangement for the filter bags which maintains them in proper operative position, permits them to be readily removed and replaced, effectively seals them and permits violent agitation without damage or undue wear of the bags.

Another object of the invention is the provision of apparatus of the class described having novel shaking or agitating mechanism for the filter bags which produces an effective whipping or shaking of the bags to remove deposited solids without damage to the bags.

Various other features and advantages of the invention will be apparent from the following particular description and from an inspection of the accompanying drawings.

Although the novel features which are believed to be characteristic of this invention will be particularly pointed out in the claims appended hereto, the invention itself, as to its objects and advantages, and the manner in which it may be carried out, may be better understood by referring to the following description taken in connection with the accompanying drawings forming a part thereof, in which:

Fig. 1 is a vertical cross-sectional view through one form of apparatus constructed in accordance with the present invention;

Fig. 2 is an enlarged fragmentary horizontal cross-sectional view taken along line 2—2 of Fig. 1 and showing particularly the mounting structure for the filter bags and the shaker mechanism;

Fig. 3 is an enlarged fragmentary cross-sectional view taken along line 3—3 of Fig. 2;

Fig. 4 is an enlarged fragmentary vertical cross-sectional view taken along line 4—4 of Fig. 3 and showing particularly the structure of a portion of the shaker mechanism;

Fig. 5 is an enlarged fragmentary cross-sectional view taken through a portion of the structure of Fig. 1 and illustrating a portion of the mounting structure for the filter bags;

Fig. 6 is an enlarged fragmentary cross-sectional view taken along line 6—6 of Fig. 5 and illustrating the details of construction of the suspension arrangement for the upper ends of filter bags;

Fig. 7 is an enlarged fragmentary cross-sectional view taken along line 7—7 of Fig. 5 and showing the details of construction of the sealing arrangement for the lower end of the filter bags; and Fig. 8 is an enlarged cross-sectional view taken along line 8—8 of Fig. 7.

Referring now particularly to Fig. 1, the apparatus includes the supporting frame 1 mounting a housing 2 which may be constituted by side walls 3 and 4, end walls 5 and 6 and a top wall 7.

One or more cell plates 31, hereinafter more fully described, divide the interior of the housing 2 into an expansion chamber 10 below the cell plates 31 and an equalizing chamber 13 above the cell plates. A filter bag unit 12 consisting of a plurality of filter bags 30 is associated with each cell plate and a space or wall-way provided between each set of units 12 to permit access to the interior of the equalizing chamber 13. A floor member 24 may be suitably supported between the cell plates to provide the walkway which cooperates with the cell plates to form a partition between the chambers 10 and 13.

An inlet conduit 14 leads into the housing 2 and communicates with an inlet chamber 15 defined by the side wall 5, a horizontal portion 16 and a vertical partition 17. The inlet chamber 15 extends downwardly and has a portion, defined by a wall 18 and baffle 19, which leads into the expansion chamber 10. The inlet chamber 15 is positioned, relatively to the expansion chamber 10, so that gas or air passing from the inlet chamber 15 to the expansion chamber 10 undergoes a relatively abrupt change in direction; also, the cross-sectional area of the expansion chamber is substantially greater than the cross-sectional area of the inlet chamber 15 whereby considerable expansion of the gas or air results when the latter passes from the inlet chamber 15 into the expansion chamber 10.

Disposed below the expansion chamber 10 is a collecting hopper 25 at the lower end of which is an outlet or discharge valve 26, of any suitable construction, having a flexible outlet tube 27 extending therefrom through which the collected solid particles can be removed from the hopper 25.

The filter bag unit 12 includes a plurality of filter bags 30, each of which includes an elongated tubular member formed of suitable fabric, as for example, sateen weave cloth, drill, wool, linen or the like, formed into a generally cylindrical structure as indicated. The lower ends of the bags 30 comprising a filter unit are secured to a cell plate 31. Two filter bag units and two cell plates are shown in Figs. 1 and 2 for purpose of illustration, which are connected to the housing, as shown in Fig. 5, as by bolts 31a.

The two cell plates are spaced apart at the center of the housing, the space between the cell plates being closed by the floor member 24, which may be supported upon transverse struts 23 secured at the ends of the housing by means of suitable brackets 22. The adjacent ends of the cell plates 31 may also be secured to the struts 23.

Referring to Figs. 5 and 7, the cell plates 31 are formed with rows of spaced openings 32 extending therethrough. Depending from the cell plate adjacent the openings are generally cylindrical flanges or aprons 33 which are slightly larger in diameter than the openings, thereby providing inwardly projecting shoulders 29. Secured to or integral with the lower end of each bag 30 is an extension 34 having its end turned back and secured to the inside of the extension 34 to provide a loop 35. Inserted in the loop 35 is a solid metal ring 36 of spring material which is normally formed of a diameter slightly smaller than the opening defined by the flange or apron 33.

To secure the filter bag 30 in the cell plate, in the manner shown particularly in Fig. 7, the extension 34 is drawn through the opening 32, and the spring ring 36 is collapsed to insert it in the flange 33 and then is released and returns to circular form. The ring then clamps the extension against the inside face of the flange 33 and thus positively prevents withdrawal of the extension from the cell plate and frictionally retains the extension 24 within the flange 33 and resists downward displacement thereof.

As shown particularly in Figs. 5 and 6, the upper end of each bag 30 is turned over and stitched to form a loop 40 which engages a suspension member 41. The suspension member 41 has a shank 45 and a hook 44 formed with a straight portion 42 inserted through the loop 40 of the bag and terminating in an upturned end 43. The shank 45 has a threaded portion 46 extending through a channel-like shaker bar 50 and adjustably secured thereto as by nuts 51.

The shaker bars 50 are arranged in pairs and are connected at each end by a bearing member 52 having a notch 53 at each end thereof, each notch receiving the shaker bar 50. Each bearing member 52 is formed with a projection 55 having a tapered knife-edge 56 seated in a V-groove 57 formed in bearing members 58. The bearing members 58 are mounted on and secured to a cross member 60 which in turn is suitably secured, as by bolts 61, to a member 62 which may form a portion of the side wall 3 of the housing.

A similar cross member 63 (see Fig. 1) supporting bearing members 58 may be provided in a similar manner at the other end of the paired shaker bars 50 and thus the shaker bars are rockably mounted as a unit in the housing.

Attached to each pair of shaker bars 50 is a bracket 70 having an extension 71 pivotally connected, as by a pin 72, to a shaker rod 73 provided for each filter unit. The shaker rods 73 serve to connect the paired shaker bars of each filter unit together for simultaneous shaking.

The shaker rods 73 may be agitated by a motor 81 mounted on a frame depending from transverse angle bars 76. The frame may be of any suitable construction and may include vertical members 77 and 78 connected by horizontal members 79 and 80. The motor 81 is mounted on a horizontal member 79 and drives a pulley 82 over which is trained a belt 83 also trained over a driving pulley 84. The driving pulley 84 is operatively mounted on and drives a shaft 85 journaled in bearings 86 which are mounted on the vertical members 78.

Keyed on shaft 85 is a plurality of eccentrics 87 each having a bearing 88 rockable thereon. Each bearing 88 is connected to a bearing 91, as by a connecting rod 89, the effective length of which may be adjusted as by lock nuts 90. The bearing 91 is connected by connecting pin 92 to a clevis 93 formed on an arm 94 of a crank 95. The crank 95 is rockably mounted by a shaft 96 journaled in bearings 97 which may be supported on the vertical supporting members 78. The other arm 98 of the crank 95 has a clevis 99 which is connected to the adjacent end of the shaker bar 73, as by a connecting pin 100.

The operation of the apparatus is as follows:

The inlet conduit 14 is connected to a suitable exhaust system or other apparatus for causing a flow of the gas or air to be cleaned through the housing 2. The gas or air is led in through the inlet conduit 14 and inlet chamber 15 and descends therethrough and passes into the expansion chamber 10, from whence it passes up through the openings 32 in the cell plates 31 and through the filter bags 30. The gas or air passes through the walls of the several filter bags 30 and into the expansion chamber 13 through the outlet chamber 21 and out through the outlet conduit 20.

The change in direction of the current of gas or air as it passes into the expansion chamber 10, together with the expansion which it undergoes in passing from the relatively confined passage 15 to the large chamber, results in a precipitation or falling out of the heavier solid particles. These particles drop by gravity into the hopper 25 from which they may be readily removed by opening the valve 26.

When the gas or air passes through the walls of the filter bags, the entrained solid particles are deposited on the inner walls of the filter bags 30. It will be noted that the cell plates 30, together with the floor member 22 of the walkway and the partitions 16 and 17 separate the expansion chamber 10 and an equalizer chamber 13 so that only clean air passes into the equalizer chamber 13 and is drawn off through the outlet conduit 20.

After a period of such operation, the exhaust fan or other circulating mechanism, is shut off and the shaker motor 81 is energized. The shaker motor drives the belt 83 and pulley 84 to rotate the shaft 85. This operates through the eccentrics 87 and bearings 88 to rock the crank shafts 89 and impart a corresponding rocking movement to the cranks 95. The rocking of the cranks 95 causes oscillation of the shaker bars 73 which in turn rocks the paired shaker channels 50 about their common pivots. The shaker channels 50 are rocked about a pivot which is midway between and approximately in line with the bottoms of the channels, thus imparting a combined vertical and horizontal oscillating movement of the hooked supporting the shaker bags.

This action causes a snapping or whipping of the upper ends of the filter bags somewhat analogous to that of a person shaking a rug, which action effectively shakes loose the solids which are deposited on the interior of the filter bags and these solids drop down into the hopper 25. The shaking of the filter bags is sufficiently violent to dislodge substantially all of the suspended solids but is of such a nature that there is no damage to or undue wear of the bags. After a brief interval of shaking, the motor 81 is deenergized and the exhaust apparatus (not shown) is again operated to circulate gas or air through the filtering apparatus. It will be seen from the foregoing that the present invention provides a simple, relatively inexpensive construction which is economical both as to operating and maintenance costs.

The pressure loss and erosion effects are kept at a minimum because of the ample spacing between the tubes and the relatively large space in the expansion and equalizing chambers. Since the gas passes through the collector bags at a relatively low velocity, there is no caking of the collected dust on the inside walls of the bags and there is little wear on the bags since the sharp particles which would abrade the bags are substantially all thrown out in the expansion chamber.

The filter bags can be quickly and easily installed, removed and replaced. The bags are under no tension or stretched in any way and therefore, have a maximum useful life. Since there is a minimum area of each bag in contact with structural parts, the bags have maximum capacity and the wear due to rubbing against structural parts is a minimum.

The novel mechanism for supporting and shaking the bags carries out this operation in such a way that it does not injure or unduly wear the bags. Since the shaker channels are supported for relatively free rocking movement, the shaking requires little power and no substantial vibration of the frame structure 1 results.

While certain novel features of the invention have been disclosed and are pointed out in the annexed claims, it will be understood that various omissions, substitutions and changes may be made by those skilled in the art without departing from the spirit of the invention.

What is claimed is:

1. Dust collecting apparatus including a supporting frame, a plurality of flexible filter elements arranged in rows, a plurality of shaker members, means rigidly connecting said shaker members by pairs to form a unitary structure, means suspending a row of said filter elements from each of said shaker members, means mounting said unitary structure on said frame for rocking movement about a pivot displaced from a vertical plane through said filter elements, and means for rocking said unitary structure about said pivot.

2. Dust collecting apparatus including a frame, a plurality of filter elements in said frame, a pair of spaced, generally parallel shaker members, means connecting said filter elements to said shaker members, means rigidly connecting said shaker members to form a unitary structure, means mounting said unitary structure for rocking movement about a pivot intermediate said shaker members, and means for rocking said unitary structure.

3. Dust collecting apparatus including, a housing, a plurality of filter elements positioned in said housing, a plurality of shaker members, means connecting pairs of said shaker members to form a substantially balanced, unitary structure, means mounting said unitary structure for rocking movement about a pivot, means connecting said filter elements to said shaker members at locations laterally offset from said pivot, and means for rocking said unitary structure about said pivot whereby at least a portion of each filter element is given a combined lateral oscillation and vertical reciprocation thereby to impart a whipping motion to said filter elements.

4. Dust collecting apparatus including a support, a plurality of filter elements, a shaker frame, means pivotally mounting said shaker frame on said support for rocking movement about a horizontal axis, means connecting said filter elements to said shaker frame, said connecting means being laterally offset from and on opposite sides of said axis, and means for rocking said shaker frame about its pivot to impart a lateral oscillatory movement to said filter elements.

5. Dust collecting apparatus including a cabinet, a tubular filter element formed from flexible material generally pervious to air but impervious to the passage of dust particles, said filter element having a closed upper end and an open lower end, a cell plate mounted in said cabinet, said cell plate having an opening therein to receive the lower end of the filter element, a closed loop formed on the lower end of the filter element, means including a resilient collapsible ring secured in said loop and forming a unit with the filter element, said cell plate having a seat to receive said ring and an inwardly extending shoulder under which said resilient ring is adapted to seat to prevent undesired upward displacement of said filter element through the opening, said ring, when collapsed, being insertable, together with the lower end of said filter bag, through said opening and adapted to expand to normal condition to clamp said filter bag in said seat, said seat being shaped to permit a downward movement of said ring therein to facilitate collapsing of said ring for removal from said cell plate, and means for supporting the upper end of said filter elements.

6. Dust collecting apparatus including a cabinet, a tubular filter element formed from flexible material generally pervious to air but impervious to the passage of dust particles, said filter element having a closed upper end and open lower end, a cell plate mounted in said cabinet, said cell plate having an opening therein to receive the lower end of the filter element, a substantially straight wall tubular seat surrounding said opening, a lip associated with said opening and providing a shoulder about said seat, said tubular filter element extending in the opposite side of said cell plate from said seat and having its end inserted in said opening, and a resilient, collapsible ring secured to the lower end of said filter element and insertable, when collapsed, through said opening into position in said seat and having a substantially straight side portion removably clamping said filter element against the wall of said seat, said collapsible ring being restrained against upward movement by said shoulder to prevent undesired upward displacement of said filter element through the opening but being movable downwardly in said seat to facilitate collapsing, and means for supporting the upper end of said filter element.

7. Dust collecting apparatus including a cabinet, a tubular filter element formed from flexible material generally pervious to air but impervious to the passage of dust particles, said filter element having a closed upper end and open lower end, a cell plate mounted in said cabinet adjacent the lower end of said tubular filter element, said cell plate having an opening therein to receive the lower end of the filter element, a flat walled, cylindrical flange depending from said cell plate in registry with said opening, an inturned lip surrounding said opening and providing a shoulder, a loop formed at the lower end of the filter element, and a cylindrical, collapsible ring member positioned within said loop and insertable, when collapsed, through said opening, together with the adjacent portion of said filter element, said filter element having a relatively flat side wall adapted to fit against the inner side of said flange and below said lip for resiliently and removably retaining the lower end of said filter element in operative position within said opening, and means for supporting the upper end of said filter element.

CLYDE A. SNYDER.